Patented Sept. 14, 1948

2,449,099

UNITED STATES PATENT OFFICE 2,449,099

GLASS HAVING LOW POWER FACTOR

William H. Armistead, Corning, N. Y., assignor to Corning Glass Works, Corning, N. Y., a corporation of New York No Drawing. Application January 23, 1945, Serial No. 574,204

8 Claims. (Cl. 106—53)

This invention relates to glass compositions and has for its primary object to provide new and useful glasses having certain special characteristics making them suitable as an insulating medium for conductors carrying radio frequency currents. As examples of such uses my new glasses are particularly suitable for the insulating laminae in electrical condensers and for sealing iron conductors into tubes and envelopes of electronic devices. Mica, which has heretofore been used for insulating such condensers, is very expensive and requires considerable selection to insure suitable uniformity in quality. Glass, on the other hand, can be manufactured relatively cheaply and with great uniformity in composition and properties. However, no glass heretofore has been devised which combines the desired characteristics to the extent that does the glass to be hereinafter described.

The desired characteristics are:

A power factor less than .06%, as measured at a frequency of one megacycle at room temperature. The power factor of dielectrics employed in high frequency circuits is very important and with radio frequencies the power loss is objectionably large unless the power factor is as low as .06% or less.

A dielectric constant of at least 7 or 8.

A temperature coefficient for dielectric constant less than 200 parts per million per degree C., is required to meet the Army-Navy specifications for fixed, mica-dielectric capacitors having extremely low power factors and adapted for use with relatively large currents. For other purposes, the temperature coefficient may be higher. By temperature coefficient is meant the rate of change of dielectric constant with change of temperature.

A softening temperature not greater than 625° C. in order to permit fusing and sealing the contiguous edges of superposed laminae of the glass without fusing intermediate metallic laminae. Softening temperature is defined in an article entitled "A method for measuring the softening temperature of glasses," by J. T. Littleton, Jour. Am. Cer. Soc., vol. 10, page 259 (1927).

A linear coefficient of thermal expansion in the neighborhood of $128 \times 10^{-7}$ centimeters per centimeter per degree C. is desirable for some purposes, such as, glass-to-metal seals with iron. Lower expansion coefficients are desirable for other purposes.

Any and all of these properties may easily be obtained at the sacrifice of others and many glasses are known which have low power factors but they lack one or more of the above mentioned properties and hence have not been entirely suitable for the purposes in view. The problem solved by me has been to obtain all of the desired properties in one glass.

It is commonly believed that alkali metal oxides in glass are generally detrimental to the electrical properties of the glass, such as power factor, and that they should be omitted or kept to a minimum if low power factors and other valuable electrical characteristics are to be obtained. It is also known that glasses having very high silica contents, in the neighborhood of 100% $SiO_2$, have exceptionally low power factors. Moreover, my prior researches have shown that the usually low power factors of some alkali-free glasses can still further be lowered by the introduction of alumina. In other words, past experience indicates that high silica, low alkali and high alumina contents are conducive to low power factors. However, they also result in high softening temperatures.

In my pending application Serial No. 558,278 filed October 11, 1944, now Patent No. 2,431,980 granted Dec. 2, 1947, it is shown that these generalizations do not hold true for glasses containing lead oxide and the alkali metal oxides, but that the presence of alumina and a high silica content are detrimental to the power factor of such glasses. Hence it is shown that such glasses possess all of the above mentioned desirable properties, provided that silica does not exceed 50%, alumina is absent and soda, potash and lithia are present in the proper ratios.

In another application, Serial No. 574,203 filed concurrently herewith and issued January 21, 1947 as Patent No. 2,414,504, I have shown that similar glasses containing BaO in lieu of PbO also possess the above mentioned desirable properties.

I have found that the above properties are also possessed by glasses which consist essentially of $SiO_2$, BaO, PbO, $K_2O$, $Na_2O$ and $Li_2O$, the $SiO_2$ being less than 65%, the total of the alkali metal oxides ($R_2O$) being more than 5% and not less than (5+X) where X is the excess of $SiO_2$ over 45%, the ratio $K_2O/Na_2O$ being from 1.5/1 to 4/1, the ratio $(K_2O+Na_2O)/Li_2O$ being from 4/1 to 19/1, the total BaO and PbO being between 10% and 60% and the ratio of BaO to PbO being less than 1 when the SiO₂ is below 40%, the glass being substantially free from Al₂O₃. The lowest power factors are obtained when the ratio K₂O/Na₂O is about 2.3/1 and the ratio $$(K_2O+Na_2O)/Li_2O$$

is about 9/1. There is no definite upper limit for the total content of alkali metal oxides, but on account of the approach of instability and for other practical reasons I prefer to use not more than a total of about 25% thereof. With a total alkali metal oxide content around 17% to 21%, glasses having very high expansion coefficients and low power factors can be produced which are particularly suitable for forming glass-to-metal seals with iron. The presence of small amounts of boric oxide does no harm but has no advantage except when it is desired to lower the expansion coefficient. If desired, the power factor and softening temperature can be lowered somewhat further by the introduction of fluorine, preferably as an alkali fluoride.

As pointed out above, the total alkali content must be not less than (5+X) where X is the excess of silica over 45%. To illustrate the critical effect which alkali metal oxides and also the presence of alumina have on the power factors of my new glasses, the following comparative compositions in percent by weight and their respective power factors are shown in Table I below. Glass A is a barium-lead glass in which R₂O is less than (5+X) and which contains alumina. In glass B the SiO₂ and R₂O were altered sufficiently to make R₂O slightly more than (5+X). The result of this was to lower the power factor by an amount equal to about 24% of its original value and to make the glass suitable for my purpose. In glass C the omission of alumina brought a further lowering of the power factor by another 5%.

*Table I*

|  | A | B | C |
|---|---|---|---|
| SiO₂ | 58.2 | 54.2 | 55.2 |
| PbO | 20.5 | 20.5 | 20.5 |
| BaO | 7.5 | 7.5 | 7.5 |
| K₂O | 8.8 | 11.6 | 11.6 |
| Na₂O | 3.0 | 3.9 | 3.9 |
| Li₂O | 1.0 | 1.3 | 1.3 |
| Al₂O₃ | 1.0 | 1.0 | |
| Power Factor, percent | .076 | .058 | .054 |
| (5+X) | 18.2 | 14.2 | 15.2 |
| R₂O | 12.8 | 16.8 | 16.8 |

In Table II examples of glasses falling within my invention and calculated in percent by weight from their respective batches, together with their properties, are given:

*Table II*

|  | 1 | 2 | 3 | 4 | 5 |
|---|---|---|---|---|---|
| SiO₂ | 45 | 45 | 45 | 40 | 38.7 |
| PbO | 25 | 17.5 | 10 | 30 | 30 |
| BaO | 10 | 17.5 | 25 | 20 | 20 |
| K₂O | 12.6 | 12.6 | 12.6 | 7 | 7 |
| Na₂O | 5.4 | 5.4 | 5.4 | 2.5 | 1.8 |
| Li₂O | 2.0 | 2.0 | 2.0 | .5 | .5 |
| Na₂SiF₆ | | | | | 2 |
| Power Factor, percent | .043 | .043 | .043 | .047 | .043 |
| Dielectric Constant | 8.2 | 8.3 | 8.3 | 8.8 | 8.8 |
| Temp. Coeff. P. P. M. per °C | | | | 120 | 120 |
| Softening Temp., °C | 524 | 543 | 553 | 590 | 575 |
| Expansion Coeff.×10⁷ | 123.3 | 121.7 | 128.2 | 106.6 | 107 |

About 1% of Sb₂O₃ was introduced into the batches for the purpose of fining the glasses. This had no substantial effect on their properties. The values for power factor were measured at a frequency of one megacycle by the method known as ASTM D-150-42T, set forth on page 1148 et sq., part III of the ASTM Standards for 1942.

It will be noted that the power factors of the above glasses are substantially below .06% and that their other properties are also suitable for the purposes set forth above. Glass 5 illustrates the effect of adding fluorine to glass 4 and the power factor and the softening point were thereby substantially reduced. Glasses 4 and 5 are particularly suitable for insulating laminae in lieu of mica in large-current, fixed condensers or capacitors. Glass 3, which has an expansion coefficient near that of iron, is particularly useful as an iron-sealing glass in the manufacture of glass-to-metal seals.

I claim:

1. A glass having a power factor less than .06%, a dielectric constant of at least 7 and a softening temperature less than 625° C., which consists essentially of SiO₂, BaO, PbO, K₂O, Na₂O, and Li₂O, the SiO₂ being more than 38% and less than 65%, the total of the alkali metal oxides being more than 5% and not less than (5+X) % where X is the excess of SiO₂ over 45%, the ratio K₂O/Na₂O being from 1.5/1 to 4/1, the ratio (K₂O+Na₂O)/Li₂O being from 4/1 to 19/1, the total BaO and PbO being between 10% and 60%, and the ratio of BaO to PbO being less than 1 when the SiO₂ is below 40%, the glass being substantially free from Al₂O₃.

2. A glass having a power factor less than .06%, a dielectric constant of at least 7 and a softening temperature less than 625° C., which consists essentially of SiO₂, BaO, PbO, K₂O, Na₂O and Li₂O, the SiO₂ being more than 38% and less than 65%, the total of the alkali metal oxides (R₂O) being more than 5% and not less than (5+X) % where X is the excess of SiO₂ over 45%, the ratio K₂O/Na₂O being about 2.3/1, the ratio (K₂O+Na₂O)/Li₂O being about 9/1, the total BaO and PbO being between 10% and 60%, and the ratio of BaO to PbO being less than 1 when the SiO₂ is below 40%, the glass being substantially free from Al₂O₃.

3. A glass having a power factor less than .06%, a dielectric constant of at least 7 and a softening temperature less than 625° C., which consists essentially of SiO₂, BaO, PbO, K₂O, Na₂O, and Li₂O, the SiO₂ being more than 38% and less than 65%, the total of the alkali metal oxides being from 5% to 25% but not less than (5+X) % where X is the excess of SiO₂ over 45%, the ratio K₂O/Na₂O being from 1.5/1 to 4/1, the ratio (K₂O+Na₂O)/Li₂O being from 4/1 to 19/1, the total BaO and PbO being between 10% and 60%, and the ratio of BaO to PbO being less than 1 when the SiO₂ is below 40%, the glass being substantially free from Al₂O₃.

4. A glass having a power factor less than .06%, and an expansion coefficient about 128×10⁻⁷ cm. per cm., per degree C., which consists essentially of SiO₂, BaO, PbO, Na₂O, K₂O, and Li₂O, the SiO₂ being more than 38% and less than 65%, the total alkali metal oxides being from about 17% to about 21%, the ratio K₂O/Na₂O being from 1.5/1 to 4/1, the ratio $$(K_2O+Na_2O)/Li_2O$$

being from 4/1 to 19/1, the total BaO and PbO being between 10% and 60%, the ratio of BaO to PbO being less than 1 when the SiO₂ is below 40%, the glass being substantially free from Al$_2$O$_3$.

5. A glass having a power factor less than .06%, a dielectric constant of at least 7 and a softening temperature less than 625° C., which has the approximate composition 38% to 55% SiO$_2$, 10% to 30% PbO, 20% to 25% BaO, 7% to 13% K$_2$O, 1.8% to 5.4% Na$_2$O and .5% to 2% Li$_2$O, the total of the alkali metal oxides being more than (5+X)% where X is the excess of SiO$_2$ over 45%, the ratio K$_2$O/Na$_2$O being from 1.5/1 to 4/1 the ratio (K$_2$O+Na$_2$O)/Li$_2$O being from 4/1 to 19/1 and the glass being substantially free from Al$_2$O$_3$.

6. A glass having a power factor less than .06%, a dielectric constant of at least 7 and a softening temperature less than 625° C., which has the approximate composition 45% SiO$_2$, 10% PbO, 25% BaO, 12.6% K$_2$O, 5.4% Na$_2$O, and 2.0% Li$_2$O.

7. A glass having a power factor less than .06%, a dielectric constant of at least 7 and a softening temperature less than 625° C., which has the approximate composition 40% SiO$_2$, 30% PbO, 20% BaO, 7% K$_2$O, 2.5% Na$_2$O and .5% Li$_2$O.

8. A glass having a power factor less than .06%, a dielectric constant of at least 7 and a softening temperature less than 625° C., which has the approximate composition 38% to 55% SiO$_2$, 10% to 30% PbO, 7.5% to 25% BaO, 7% to 13% K$_2$O, 1.8% to 5.4% Na$_2$O, and .5% to 2% Li$_2$O, the total of the alkali metal oxides being more than (5+X)% where X is the excess of SiO$_2$ over 45%, the ratio K$_2$O/Na$_2$O being from 1.5/1 to 4/1, the ratio (K$_2$O+Na$_2$O)/Li$_2$O being from 4/1 to 19/1 and the glass being substantially free from Al$_2$O$_3$.

WILLIAM H. ARMISTEAD.

REFERENCES CITED

The following references are of record in the file of this patent:

UNITED STATES PATENTS

| Number | Name | Date |
|---|---|---|
| 2,018,816 | Taylor | Oct. 29, 1935 |
| 2,018,817 | Taylor | Oct. 29, 1935 |